(12) United States Patent
Tamir et al.

(10) Patent No.: US 11,574,443 B2
(45) Date of Patent: Feb. 7, 2023

(54) TECHNIQUES FOR IMPROVING MESH ACCURACY USING LABELED INPUTS

(71) Applicant: Tetavi Ltd., Petach-Tiqva (IL)

(72) Inventors: Michael Tamir, Tel Aviv (IL); Gilad Talmon, Tel Aviv (IL); Vsevolod Kagarlitsky, Ramat Gan (IL); Shirley Keinan, Tel-Aviv (IL); David Drezner, Raanana (IL); Yair Baruch, Tel-Aviv (IL); Michael Birnboim, Holon (IL)

(73) Assignee: Tetavi Ltd., Petach-Tiqva (IL)

( * ) Notice: Subject to any disclaimer, the term of this patent is extended or adjusted under 35 U.S.C. 154(b) by 0 days.

(21) Appl. No.: 17/197,374

(22) Filed: Mar. 10, 2021

(65) Prior Publication Data
US 2021/0304495 A1    Sep. 30, 2021

Related U.S. Application Data

(60) Provisional application No. 63/001,783, filed on Mar. 30, 2020.

(51) Int. Cl.
*G06T 17/20*    (2006.01)
*G06V 20/40*    (2022.01)
*G06V 40/16*    (2022.01)

(52) U.S. Cl.
CPC .............. *G06T 17/20* (2013.01); *G06V 20/41* (2022.01); *G06V 40/166* (2022.01)

(58) Field of Classification Search
CPC ....... G06T 17/20; G06V 20/41; G06V 40/166
See application file for complete search history.

(56) References Cited

U.S. PATENT DOCUMENTS

| 10,192,343 | B2 | 1/2019 | Bouaziz et al. | |
|---|---|---|---|---|
| 2015/0178988 | A1 | 6/2015 | Mora et al. | |
| 2019/0147220 | A1* | 5/2019 | McCormac | G06K 9/6277 |
| | | | | 382/103 |
| 2019/0304157 | A1* | 10/2019 | Amer | G06V 20/41 |

OTHER PUBLICATIONS

International Search Report and Written Opinion of International Searching Authority for PCT/IB2021/052001, ISA/IL, Jerusalem, Israel, dated May 31, 2021.
Léon V, Bonneel N, Lavoué G, Vandeborre JP. Continuous semantic description of 3d meshes. Computers & Graphics. Feb. 1, 2016,54:47-56. Leon et al. Feb. 1, 2016 (Feb. 1, 2016). the whole document.

* cited by examiner

*Primary Examiner* — Michelle Chin
(74) *Attorney, Agent, or Firm* — M&B IP Analysts, LLC

(57) ABSTRACT

A method and system for improving a three-dimensional (3D) representation of objects using semantic data. The method comprises receiving an input data generated in response to captured video in a filming area; setting at least one parameter for each region in the input data; and generating a 3D representation based in part on the at least one parameter and semantic data associated with the input data.

25 Claims, 9 Drawing Sheets

TECHNIQUES FOR IMPROVING MESH ACCURACY USING LABELED INPUTS

CROSS-REFERENCE TO RELATED APPLICATIONS

This application claims the benefit of U.S. Provisional Application No. 63/001,783 filed on Mar. 30, 2020, the contents of which are hereby incorporated by reference.

TECHNICAL FIELD

The present disclosure relates generally to capturing, recording, streaming, and displaying free viewpoint videos and, in particular, to the generation of 3D models in free viewpoint videos.

BACKGROUND

The representation of objects in three dimensions, within a computer system, is a growing field with numerous applications in art, science, technology, and other fields. Generally, 3D representation refers to the description of an object in space and time, describing, for example, a moving human being by using a series of meshes which correspond to the human's movements. 3D representations are useful in generating virtual models in medicine, providing environments and virtual resources for videogames, creating compelling films, animations, and artistic renderings in VR and AR environments, and other applications. Current systems for generating 3D representations may be limited by system resources, application constraints, and other factors, limiting the scope and quality of the representations which can be created.

Within the domain of 3D representation, 3D modeling refers to the process of forming the shape of an object, as opposed to the application of textures and animation sequences to the model generated. 3D models may be generated as solid models or shell models, each possessing unique aspects. Solid modeling, wherein the surfaces and the volume of an object are defined, produces 3D models suitable for medical purposes and engineering design and simulation. Shell models represent the surface of an object without representing the object's volume. Shell models may be applied in animation, as in digital filmmaking or video game design.

In addition to the form of the 3D representation, either as a solid or a shell, multiple techniques exist to generate 3D models. The techniques applied, each with unique advantages and disadvantages, provide model creators with flexibility in design, allowing for emphasis of certain, important, features over others. Popular modeling techniques include polygon modeling, curve modeling, and digital sculpting.

Polygon modeling allows for the creation of 3D models by connecting points in a 3D space to form a mesh of polygons. Polygon modeling is popular due to the speed and flexibility with which the models can be generated and manipulated. However, polygon modeling is limited in certain respects, such as the representation of curved surfaces, which may be difficult to approximate using a finite number of angular polygons.

In addition, curve modeling allows for the representation of curved surfaces using weighted points. By defining a curve with respect to a series of points, the geometry of a surface can be modeled without polygon modeling. Curve modeling relies on the assignment of weighting values to the points defining the curve, where points with higher weighting values draw the path of the curve closer to the points. Curve modeling, capable of representing curved surfaces, lacks the advantages of polygon modeling, namely, speed and flexibility in model generation.

Digital sculpting may also be used to generate 3D models. Digital sculpting platforms allow a user to generate a 3D model by manipulating a virtual material as if it were a bulk of clay, metal, or other material.

Popular 3D modeling techniques generally share certain disadvantages. While 3D modeling may be more efficient with certain techniques than with others, the process of generating a 3D model and mapping motion of the model may be resource-intensive. 3D modeling tasks may require significant storage space and processing power. Furthermore, 3D modeling tasks may require resources beyond what a modeling system has available, creating a need for extended processing time to compensate for a lack of processing resources. Where extended processing time is necessary, 3D modeling may not be appropriate for the creation of live or low-delay video, preventing the use of 3D modeling as a preferred tool in certain applications, such as live video.

Recently-developed applications of 3D modeling include the use of model generation in the creation of Free Viewpoint Video (FVV), a technique by which video feeds from one or more cameras are combined to virtualize the captured scene, allowing a viewer to select a viewing angle outside those provided by the cameras used. FVV may be generated by creating models of human actors or other parts or objects in a scene, based on the video captured by the one or more cameras, rendering the scene using the generated models, based on the movement captured by the cameras, and allowing a viewer to add a virtual camera, positioned to view the model-version of the scene from an angle not captured by the original, physical cameras. FVV may be useful in applications such as sports broadcasting, where the addition of virtual cameras allows fans to view a match from various angles not accessible by traditional cameras. Further, the addition of virtual cameras to a sports broadcast may allow referees to review contested plays from multiple angles and may allow for a reduction in the number of physical cameras, and associated hardware, necessary to comprehensively broadcast a match. In addition to sports broadcasts, FVV may be useful in the generation of multiple viewpoints for broadcasts such as plays and concerts, as well as for analysis of moving bodies, such as in automobile design and safety testing, motion capture, and other, like, applications.

FVV systems rely on model-generation technologies, including 3D modeling systems, to create 3D models based on the scene captured by the camera or cameras. As 3D modeling is essential to the creation of FVV, FVV systems may be restricted by the limitations of 3D modeling systems. Further, as a captured scene may include multiple moving bodies, complex motion, rich visual information, and other complicating factors, the conversion of the captured scene into a 3D representation, within which a viewer may place a virtual camera, and other aspects of FVV applications, may require substantial storage and may demand significant processing power. In addition, as FVV applications may include video which a viewer wishes to receive live or in near-real-time, the addition of significant delays between capture and broadcast, due to a system's inability to keep up with the processing demands of FVV generation, may be unacceptable to viewers and broadcasters. These challenges may be addressed by providing additional processing resources for 3D modeling systems, which may be prohibitively expensive, or by reducing the processing load required for a given 3D modeling task by reducing the quality of models, meshes, textures, and other aspects of modeling and broadcasting tasks. While improving the efficiency of 3D modeling by reducing processing loads may allow for live or near-real-time broadcast of 3D-modeled scenes, current improvements to 3D modeling systems are insufficient to allow for live or near-real-time FVV creation using 3D modeling.

The above-noted 3D modeling techniques do not address the current need for rendering free viewpoint video for studio applications or live broadcast. The benefits of a system configured to address the challenges noted may provide for the rendering of free viewpoint video for such applications, allowing rendering of high-quality video from most viewpoints.

It would, therefore, be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for improving a three-dimensional (3D) representation of objects using semantic data. The method comprises receiving an input data generated in response to captured video in a filming area; setting at least one parameter for each region in the input data; and generating a 3D representation based in part on the at least one parameter and semantic data associated with the input data.

Certain embodiments disclosed herein include a system for receiving an input data generated in response to captured video in a filming area. The system comprises a processing circuitry; and a memory, the memory containing instructions that, when executed by the processing circuitry, configure the system to: receive an input data generated in response to captured video in a filming area; set at least one parameter for each region in the input data; and generate a 3D representation based in part on the at least one parameter and semantic data associated with the input data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
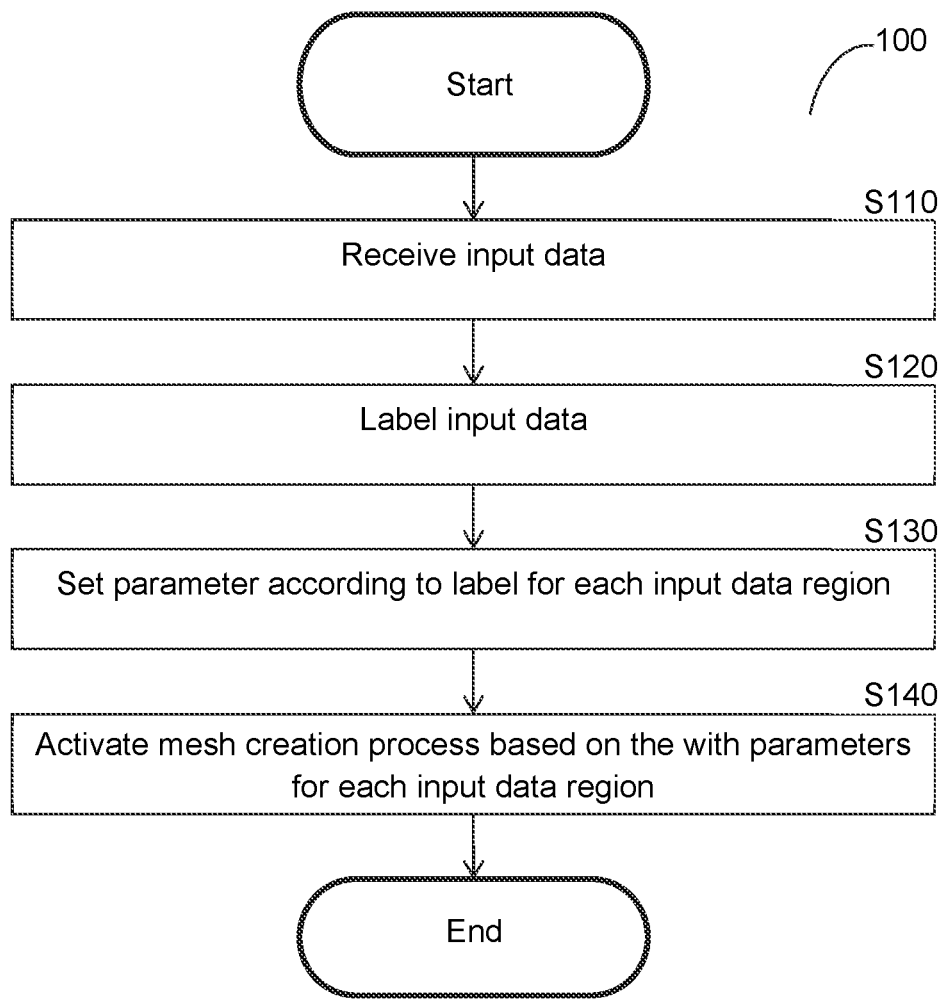
FIG. 1 is a flowchart illustrating a method for a creating a 3D representation, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example flowchart 100 illustrating a method for a creating a 3D representation, according to an embodiment. At S110, input data is received. The received input data may be, as examples and without limitation, one or more images, one or more clouds of points, pixels, or voxels, or other, like, input data. The input data may be received by means including, without limitation, direct capture, as in the case of an integrated camera or sensor, by wireless data transfer over protocols such as, as examples and without limitation, Wi-Fi, Bluetooth, and other, like protocols, over wired protocols such as, as examples and without limitation, ethernet, USB, and other, like protocols, or by transfer of physical media such as, as examples and without limitation, CDs, DVDs, disk drives, SD cards, and other, like, media.

The acquired input data may be received actively, as a response to a request for input data, generally, or, for specific input data, received passively, as in the case of accepting an input data upload, or by any combination of passive and active reception. The input data received may be received from sources including, without limitation, cameras, sensors, databases, servers, user devices, computers, and other, like, sources. In an example embodiment, the input data is video captured in a studio, a venue, an arena, and the like. The video may be captured using a set of cameras deployed as discussed in FIG. 8.

At S120, the input data, acquired at S110, is labeled. In an embodiment, some of the input data may be labeled and, in an alternate embodiment, all of the input data is labeled. In an embodiment, where the input data includes images, areas within an image can be labeled using labels such as, as examples and without limitation, head, hand, leg, shirt, and other, like, labels. In an embodiment, labels may be generated through techniques including, without limitation, deep learning, as well as variants thereof such as, as examples and without limitation, supervised deep learning, unsupervised deep learning, and other, like, techniques. Where the input data is a cloud of points, pixels, or voxels, the individual points, pixels, or voxels, or the cloud, area, or volume in which the points, pixels, or voxels reside, may be labeled.

At S130, mesh parameters are set according to labels for each input data region. Where input data is acquired at S110, and where the acquired input data is subsequently labeled at S120, various methods may be applied to each labeled region. In an embodiment, the methods to be applied to a labeled region, and the parameter values which a method includes in calculation, may be modified according to factors including, without limitation, the end goal of method execution, the processes composing the method, the contents of a labeled region, the contents of neighboring regions, and other, like factors. The mesh parameters may include parameters for determining the density of a generated mesh, which could be adjusted to provide for a higher mesh density in a face region, and/or for a smoother mesh in the leg region.

At S140, processes incorporating set parameters are activated for each input data region. In an embodiment, the processes activated at S140 may include one or more parameters set at S130. The processes activated at S140 may vary in the process of execution, the result of execution, or a combination of the two. One or more of the algorithms activated at S140 may be designed for, tailored to, or otherwise adapted to application to a particular labeled region.

In an embodiment, the activated process or processes may be intended to produce, and the processes may produce, results including, without limitation, the generation of meshes, the analysis of un-meshed parts, the application of textures or lighting, any other, like, result, as well as any combination thereof. In an embodiment, the process, at S140, may include the activation of processes with or without mesh parameters set at S130 and may include activation of algorithms directed to input data regions which are labeled, input data regions which are unlabeled, and any combination or subset thereof.

Figure 2:
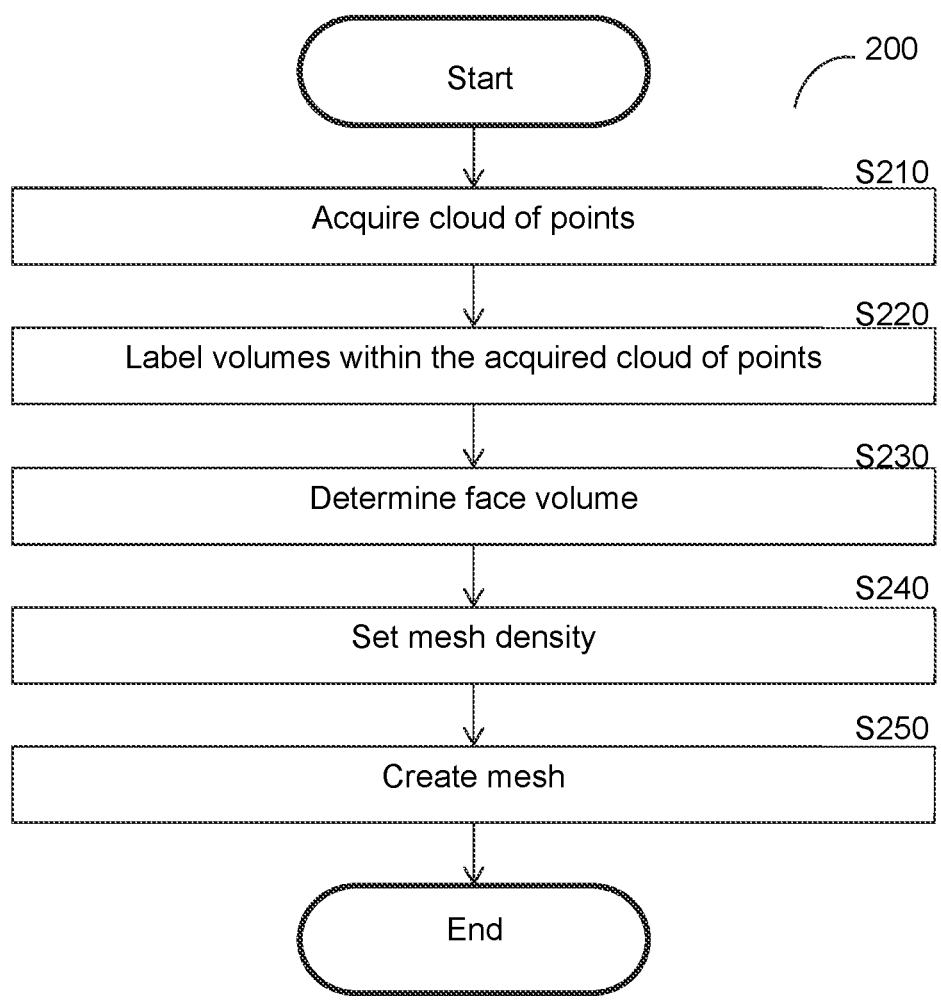
FIG. 2 is a flowchart illustrating the application of a 3D representation creation process to mesh-generation from a cloud of data points, according to an embodiment.

FIG. 2 is an example flowchart 200 illustrating the application of a 3D representation creation process to mesh-generation from a cloud of data points, according to an embodiment. At S210, a cloud of points is acquired. In the example embodiment, the acquired cloud of points may be acquired by any of the methods described with respect to S110 in FIG. 1, above. The acquired cloud of points may be a pixels, voxels, a cloud of points, or any combination thereof. The acquired cloud of points may represent a structure, an object, a picture, other, like, entities, and any combination or subset thereof.

At S220, volumes within the cloud of points, acquired at S210, are labeled. In the example embodiment, the cloud of points may contain representations of one or more human bodies. In the embodiment, possible labels may include, and are not limited to, ears, eyes, face, legs, and other, like labels. The labeling of volumes within the cloud of points may include those methods, processes, and features described with respect to step S120 in FIG. 1, above.

At S230, it is determined whether a given labeled volume is a face, e.g., of a human body. The determination of whether a given labeled volume is a face is relevant to subsequent processing. In an embodiment, the determination of whether a given labeled volume is a face may dictate the appropriate mesh density at subsequent steps. The determination of whether a given labeled volume is a face may depend on factors including, without limitation, the label assigned to the volume at S220, a confidence rating for the label assigned at S220, the labels assigned to adjacent volumes, other, like, factors, and any combination thereof.

At S240, the mesh density is set based on a determination that the labeled volume is a face at S230. In an embodiment, where, at S230, a given volume is determined to be a face, the mesh density may be adjusted to specify a high mesh density. Alternatively, where, at S230, the given volume is determined not to be a face, the mesh density may be adjusted to specify a low mesh density. In adjusting parameters to set the mesh density, reference may be made to step S130 of FIG. 1 which describes, as above, a generic process of adjusting algorithm parameters based on data labels.

At S250, a mesh is created. The created mesh may include one or more volumes, volumes with different labels, unlabeled volumes, and any combination thereof. The mesh may be created according to a process, which may include variable parameters, static parameters, or a combination of the two. In an embodiment, the mesh may be created according to a mesh which includes variable parameters, where the variable parameters are set at S240 according to the labeling determinations made at S230. The mesh creation at S250 may include processes, elements, or other features described above with respect to S140 in FIG. 1.

Figure 3:
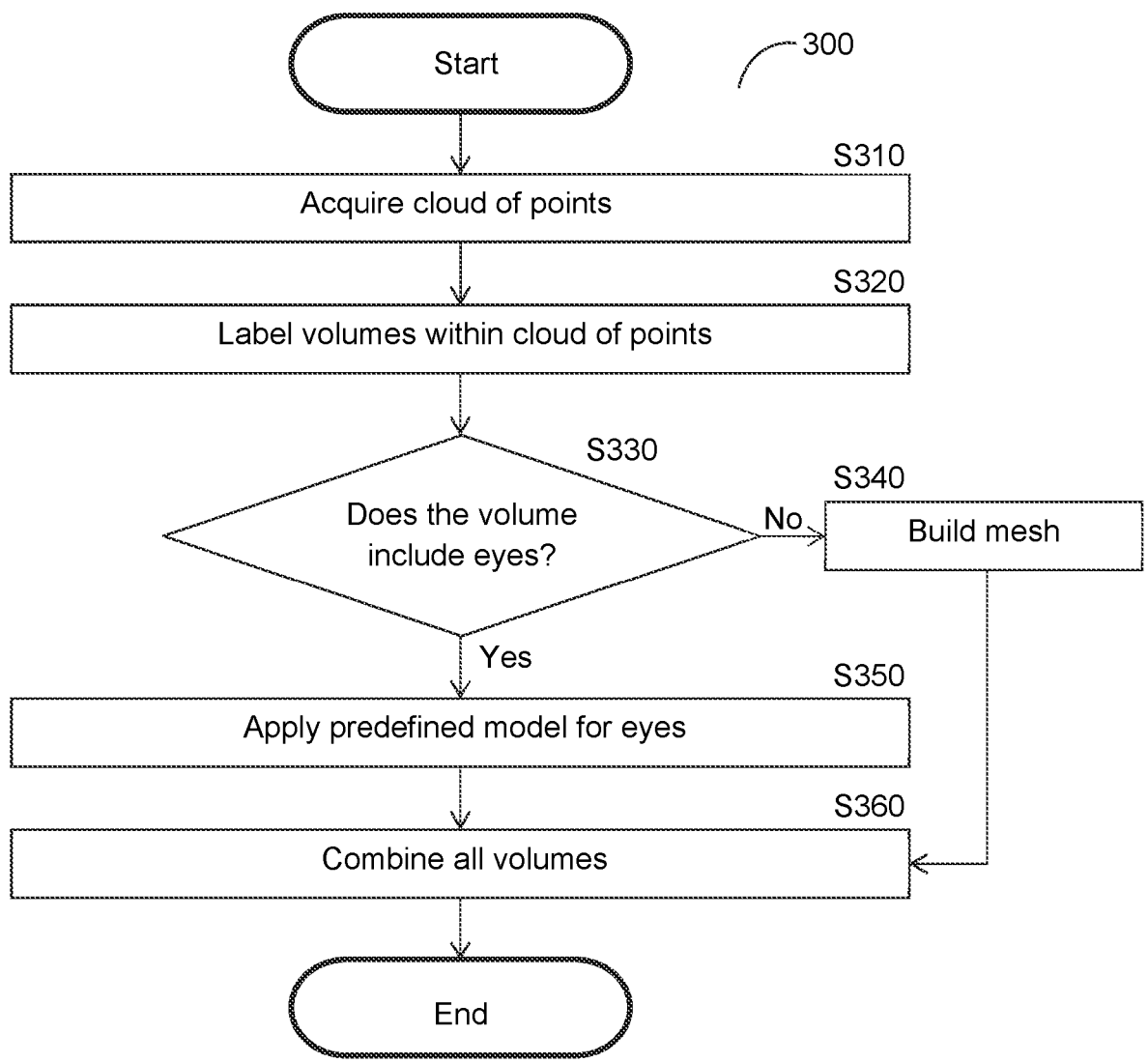
FIG. 3 is a flowchart illustrating the application of a 3D representation creation process to model construction and combination from a cloud of points, according to an embodiment.

FIG. 3 is an example flowchart 300 illustrating the application of a 3D representation creation process to model construction and combination from a cloud of points, according to an embodiment. At S310, a cloud of points is acquired. In an embodiment, the acquisition of a cloud of points at S310 may be conducted in a manner similar, or identical, to that employed at S210 of FIG. 2, described above, to acquire a cloud of points. Further, the acquisition of a cloud of points at S310 may include processes, methods, or other aspects of the acquisition of input data described above with respect to S110 of FIG. 1.

At S320, volumes within the cloud of points are labeled. In an embodiment, the labeling of the cloud of points at S320 may be conducted in a manner similar, or identical, to that employed at S220 of FIG. 2, described above, to label a cloud of points. Further, the labeling of the cloud of points at S320 may include processes, methods, or other aspects of the labeling of input data, described above with respect to S120 of FIG. 1. The detection of a feature, such as arms, legs, eyes, faces, and the like, may include detection of features in datasets including, without limitation, two-dimensional images, clouds of points, three-dimensional images, and other, like datasets.

At S330, it is a determined whether a given volume (or region) includes eyes. In an embodiment, the determination at S330 may concern another feature such as, as examples and without limitation, faces, legs, ears, and the like. The determination of whether the volume includes eyes may include analysis of factors including, without limitation, the label assigned, if any, to the volume at S320, a confidence rating for the label assigned at S320, the labels assigned to adjacent volumes, other, like, factors, and any combination thereof. In an embodiment, where, at S330, a determination is made that a given volume does not include eyes, a mesh may be built at S340. Alternatively, in an embodiment, where, at S330, a determination is made that a given volume does include eyes, a predefined model for eyes may be used at S350.

At S340, where a given volume is determined, at S330, not to include eyes, a mesh may be built for the given volume. The mesh built at S340 may include multiple volumes, multiple labels, and any combination thereof, where the included volumes and labels are not determined, at S330, to be eyes. In an embodiment, the mesh generation at S340 may include processes, features, or other elements described above with respect to S140 of FIG. 1.

At S350, a predefined model for eyes is applied where, at S330, a determination is made that a given volume includes eyes. In an embodiment, the predefined model may concern body parts other than eyes such as, as examples and without limitation, ears, legs, faces, and the like. The predefined model may be generated in anticipation of a specific modeling task, generated for general future applications, or extracted from a separate model developed separately from the process described in the flowchart 300. The predefined model may be stored locally on a user device, may be hosted on a remote or cloud server or computer, or may be stored on a removable medium such as a USB drive, a CD or DVD, and other, similar, media.

It may be noted that steps S340 and S350 are so numbered for purposes of illustration and may be re-ordered without any loss of generality or departure from the scope of the description. S340 and S350 may occur in any order, including simultaneously, provided that neither S340 nor S350 executes before S330 and provided that both S340 and S350 execute before S360. In an embodiment, where no volumes include eyes, the method described in the flowchart 300 may proceed from S330 to S340 and directly to S360. In an alternate embodiment, where all volumes include eyes, the method described in the flowchart 300 may proceed from S330 to S350 and directly to S360, without S340.

At S360, volumes are combined to create a unified mesh. Where, in an embodiment, at least one mesh is applied at S350 or generated at S340, the one or more accessed or generated meshes may be combined into a single mesh, representing the volume described by the cloud of data points acquired at S310. In an embodiment, the unified mesh may include labels, characteristics, or other features distinguishing the volumes which are combined to create the combined mesh. The unified mesh may include some or all of the meshes accessed and generated.

Figure 4:
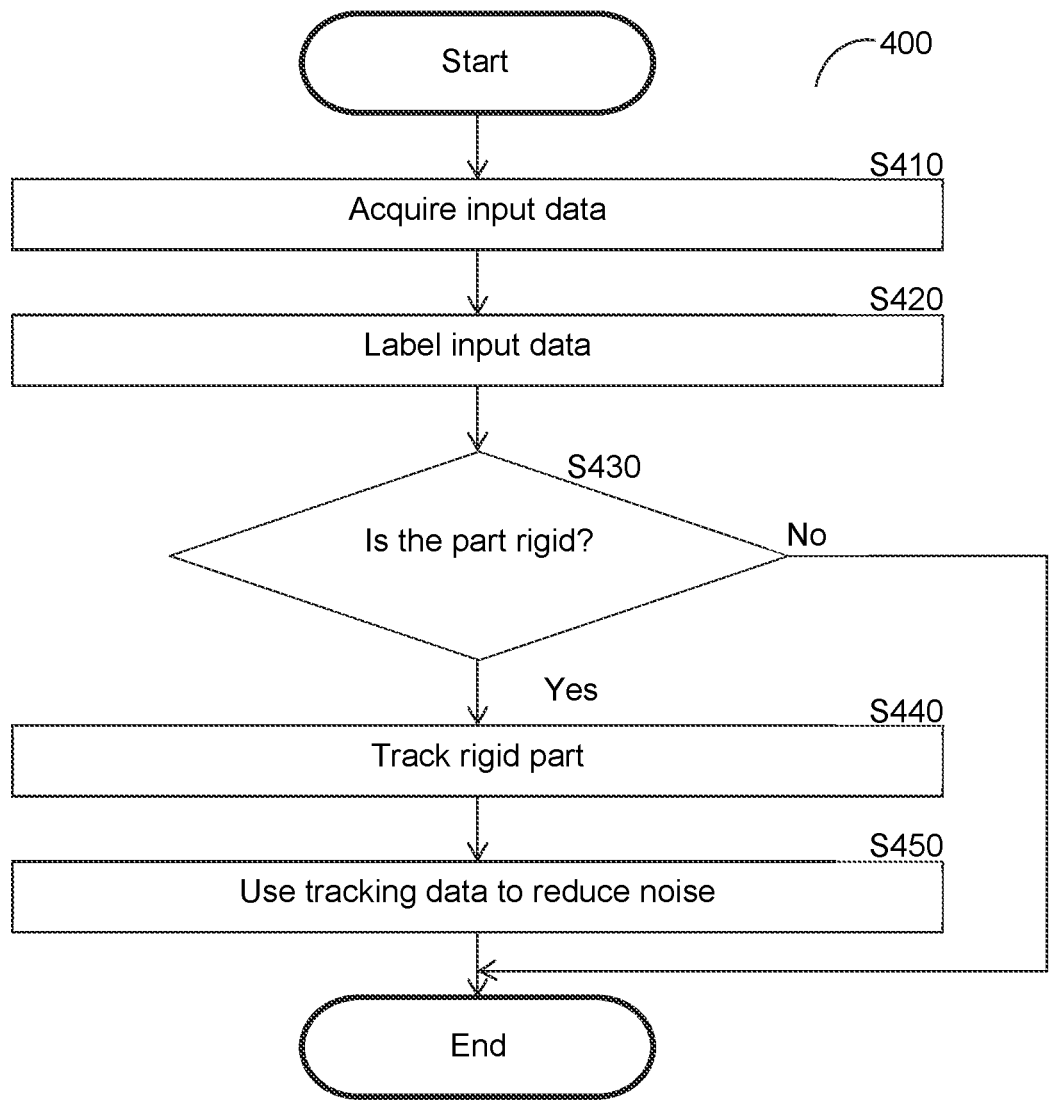
FIG. 4 is a flowchart illustrating a process for improving geometric stability of rigid parts over time using semantic information, according to an embodiment.

FIG. 4 is an example flowchart 400 illustrating a process for improving geometric stability of rigid parts over time using semantic information, according to an embodiment. The process depicted in the flowchart 400 may be applicable to the improvement of mesh quality by "smoothing" the mesh in the time domain using semantic data.

At S410, input data is acquired. The acquisition of input data at S410 may include processes, methods, or other aspects of, and may be similar or identical to, the acquisition of input data described above with respect to S110 of FIG. 1.

At S420, input data is labeled. The labeling of input data at S420 may be performed by methods similar or identical to those described with respect to S120 of FIG. 1, above. Further, at S420, semantic data may be applied to improve labeling and subsequent operations. The application of semantic data at S420 may include the detection of three-dimensional body parts in sequences which change over time. It should be noted that labeling is considered semantic information, and descriptive information such as, as examples and without limitation, "arm is rigid" and "hair is not rigid," is also considered semantic.

At S430, a determination is made as to whether a given part is rigid. The determination of whether a given part is rigid may depend on factors including, without limitation, the data label applied at S420, a confidence rating associated with the data label applied at S420, the labels applied to adjacent parts, semantic data, other, like, information, and any combination thereof. Where a part is determined not to be rigid, analysis may terminate for the part in question and begin at S430 for a subsequent labeled part from the same input data, or at S410 for new input data. Where a point is determined to be rigid, analysis may continue at S440.

At S440, a rigid part is tracked. In an embodiment, at S440, multiple rigid parts may be tracked. Tracking a rigid part may include isolating a known rigid part from a larger set of parts. Further, tracking a rigid part may include tracking the movement, deformation, or other change in the rigid part across a time sequence. Tracking data may be stored temporarily, as in RAM or other short-term memory, or stored on a permanent or semi-permanent basis in a fixed storage medium such as, as examples and without limitation, a hard drive, a USB drive, a CD or DVD, a remote or cloud-based storage, other, like, storage media, and any combination thereof.

At S450 tracking data is used to reduce noise. Tracking data may be used to reduce noise by treating subsegments of parts as rigid bodies. As an example of the application of tracking data to the reduction of noise, a mean model of each part, created from tracking data across a time sequence, may be applied to subsequent deformation of the original meshes, thereby improving stability across the sequence.

Figure 5:
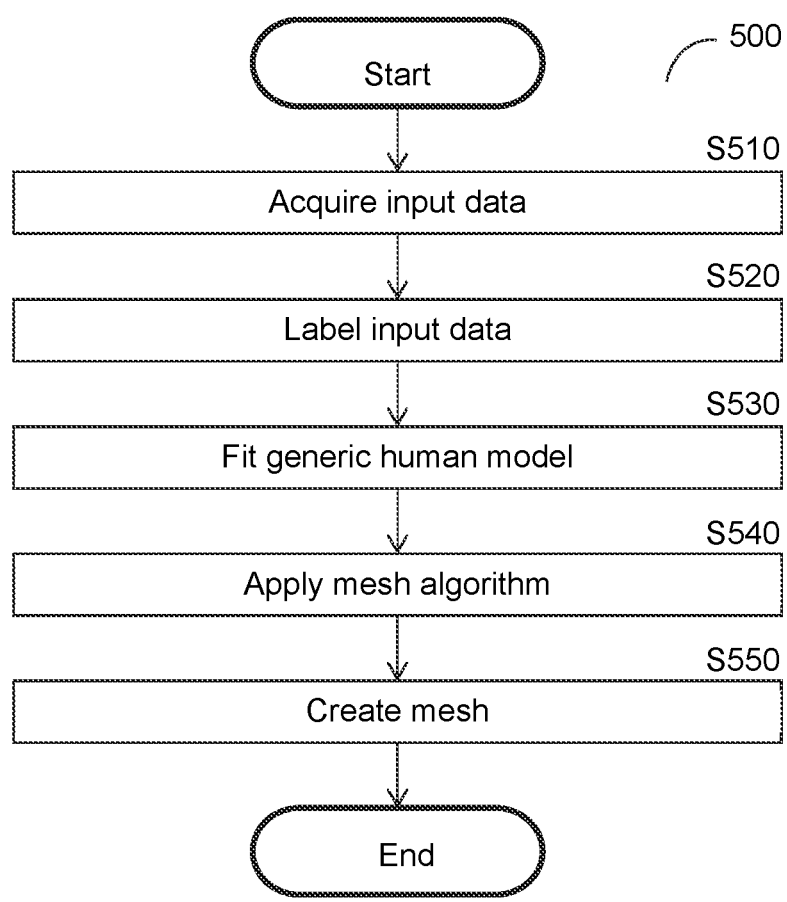
FIG. 5 is a flowchart illustrating a process for creating a mesh from a set of input data, according to an embodiment.

FIG. 5 is an example flowchart 500 illustrating a process for creating a mesh from a set of input data, according to an embodiment. Here, the mesh is created using a human blendshape fitting process and a type of semantic method.

At S510, input data is acquired. The acquisition of input data at S510 may include processes, methods, or other aspects of, and may be similar or identical to, the acquisition of input data described above with respect to S110 of FIG. 1. The acquired input data may be a photo, video, cloud of points, other input data, or any combination thereof.

At S520, input data is labeled. The labeling of input data at 520 may be performed by methods similar or identical to those described with respect to S120 of FIG. 1, above. Further, semantic data may be applied to labeling at S520, providing for the labeling of known semantic landmarks such as, as examples, and without limitation, joints, facial features, and like semantic landmarks. In an embodiment, labels may be generated though techniques including, without limitation, blendshape processes.

At S530, the labeled input data is fit to a generic human model. In an embodiment, the generic human model may be a blendshape model, a three-dimensional morphable model, or another, like, model. Labeled input data may be fit to the generic human model by correlating the generic human model with one or more labeled data points according to semantic landmark locations.

At S540, a mesh algorithm is applied. The mesh algorithm may be applied to generate a mesh based on the input data acquired at S510, the input data labeled at S520, other data, and any combination thereof. The mesh algorithm used may be similar to an algorithm described above and may include the application of a variably-parameterized mesh algorithm, a static-parameter mesh algorithm, or a combination of the two.

At S550, a mesh is created. The mesh may be created according to the methods described above. In an embodiment, mesh creation may include merging the model fitted at S530 with the data acquired at S510 and used for mesh generation, thereby improving mesh quality and assisting in mesh generation.

Figure 6:
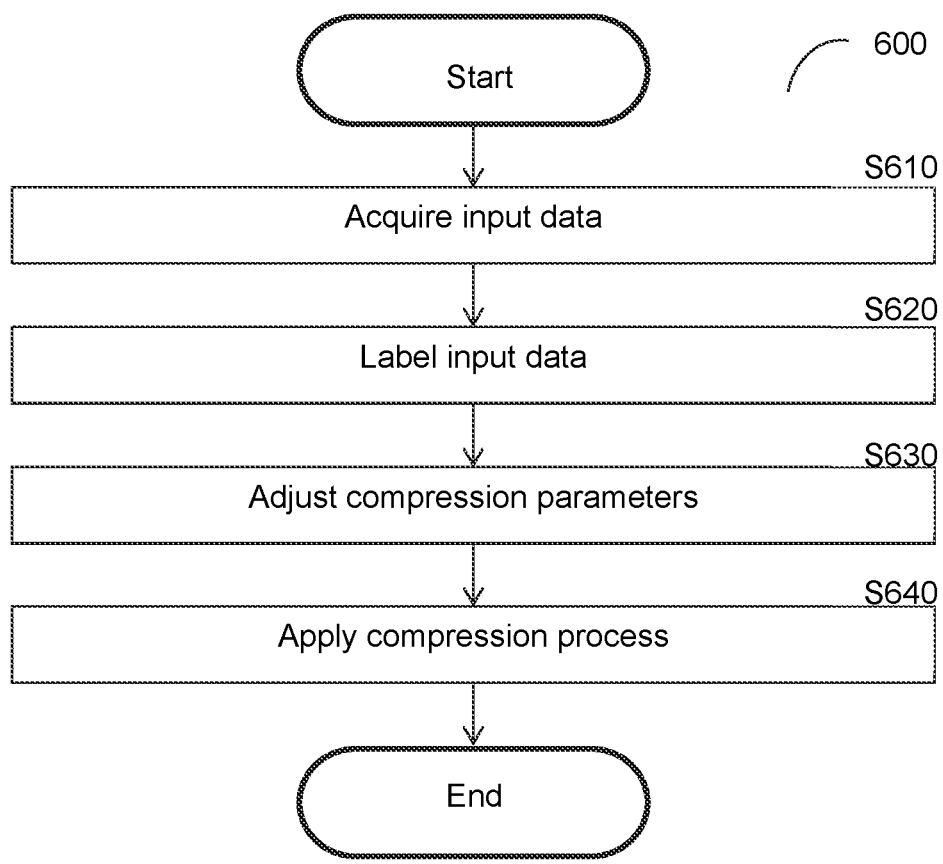
FIG. 6 is a flowchart illustrating a process for generating a model representing acquired input data and, subsequently, compressing that model using a parameterized compression process, according to an embodiment.

FIG. 6 is an example flowchart 600 illustrating a process for generating a model representing acquired input data and, subsequently, compressing that model using a parameterized compression process, according to an embodiment. The process depicted in FIG. 6 allows for the adjustment and application of parameterized compression processes. In an embodiment, S610 and S620 execute in a manner similar or identical to steps S110 and S120, as depicted in FIG. 1, above, respectively, and may achieve results similar or identical to the results of steps S110 and S120, as described above. It may be noted that steps S610 and S620 execute independently of any step illustrated in FIG. 1, the steps of which serve as examples for the execution of steps S610 and S620, according to an embodiment.

At S630, compression parameters are adjusted. The compression parameters adjusted at S630 may be applied to tune the application of a compression process, where the compression process is performed after the creation of a mesh or other algorithm activation. The compression parameters adjusted at S630 may be adjusted to allow for a desired compression result or a specific compression process.

In an embodiment, the compression parameters are adjusted based on the region. At S630, the compression process parameters may be set to result in a compression which preserves geometric information in semantically-important regions, such as the face, which preserves high quality texture information, and which results in a coarse mesh with a more-compressed texture in less-important regions, such as the arms or legs, thereby preserving geometric and texture quality during compression.

At S640, the compression process is applied. In an embodiment, the compression process may achieve a reduction in file size by reducing the level of detail in a three-dimensional representation by applying semantic information to determine levels of detail for various semantic regions, by other, like, techniques, or by any combination thereof. Further, in an embodiment, reduction of file size may be achieved by applying varying degrees of compression to textures applied to different regions of a model. As an example of such an application of variable texture compression, identification of a face and an arm, and a policy specifying that details of a face are more important than details of an arm, may be applied to compress the texture applied to the arm to a greater degree than the texture applied to the face. The compression process applied may be parameterized and may include those compression algorithm parameters adjusted at S630.

Figure 7:
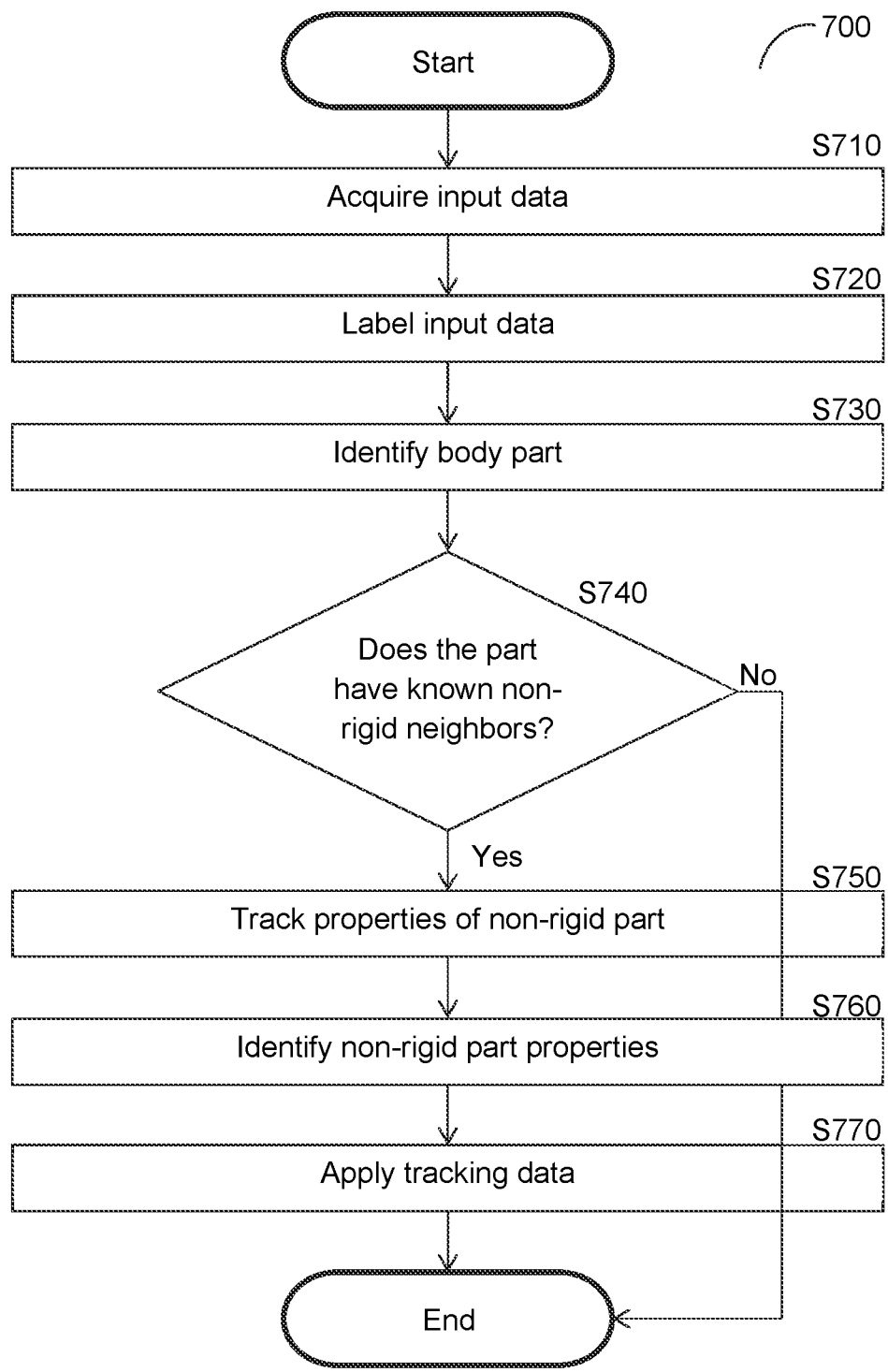
FIG. 7 is a flowchart illustrating a process for determining properties of non-rigid parts in a model and stabilizing the parts using semantic methods, according to an embodiment.

FIG. 7 is an example flowchart 700 illustrating a process for determining properties of non-rigid parts in a model and stabilizing the parts using semantic methods, according to an embodiment. In an embodiment, the detection of semantic features which are known to have nearby non-rigid areas, the detection of properties of nearby non-rigid areas, and the subsequent application of the detected properties to stabilize the non-rigid area may allow for improvements in the modeling of non-rigid parts.

In an example embodiment, as depicted in the flowchart 700, S710 and S720 correspond with steps S110 and S120 of FIG. 1, as depicted above. S710 and S720 may achieve similar or identical results to steps S110 and S120, respectively, by application of similar or identical methods. Further, the execution of S710 and S720 may include processes, elements, or other aspects of the methods depicted in FIGS. 2-6, achieving similar or identical results by similar or identical processes.

At S730, a body part is identified. The identification of a body part at S730 may include analysis of factors including, without limitation, the label assigned at S720, a confidence rating corresponding to the label assigned at S720, neighboring parts, other, like, factors, and any combination thereof. Further, the identification of a body part at S730 may include consideration of semantic information relating to area identification, position, and other, related, semantic information.

At S740, a determination is made as to whether a given part has any known, non-rigid neighbors. The determination of whether a given part has any known, non-rigid neighbors may allow for the improvement of geometric stability for non-rigid body parts with time. The determination may consider semantic information, part labels, part label confidence ratings, known neighbors, other, like, factors, and any combination thereof. Where, at S740, a part is determined to have no known, non-rigid neighbors, execution of the non-rigid part modeling depicted in FIG. 7 may terminate. Where, at S740, a part is determined to have known, non-rigid neighbors, execution may continue with step S750.

At S750, properties of the non-rigid part are tracked. A non-rigid part may include, for example, hair. Where, at S740, a part is determined to have known, non-rigid neighbors, the non-rigid neighbors identified at S740, and their properties, are tracked at S750. Properties of the non-rigid body part may include color, shape, and the like. For example, a tracked face is known to be surrounded by hair. It may be deduced that the hair is blond and that, by identifying the hair regions that are far from the face, the hair obscures regions from a camera, which does not see the face because it is hidden.

Non-rigid parts may be tracked by methods including, without limitation, tracking part end and middle points, tracking movement directions and displacements, other, like, techniques, and any combination thereof.

At S760, non-rigid part properties may be identified. Non-rigid part properties may be identified by analysis of part tracking data developed at S750, analysis of subsequently-developed movement models, other, like, analyses, and any combination thereof. Identified non-rigid part properties may include, without limitation, part weight, part dimensions, part flexibility and stiffness, other, like, properties, and any combination thereof.

At S770, tracking data is applied. Tracking data may include, and is not limited to, analyses of movement and properties tracked at S750, analysis of subsequently-developed movement models, analysis of part properties identified at S760, analysis of other, like, factors, or any combination thereof. Tracking data may be applied to reduce noise by creating models for the non-rigid parts, based on the non-rigid part properties identified at S760, and the subsequent application of the created models to improve future modeling of similar and identical non-rigid features. In addition, tracking data may be used to improve mesh and temporal coherence by, as an example and without limitation, smoothing over time by refining the geometry of tracked parts using data collected from tracking.

Figure 8:
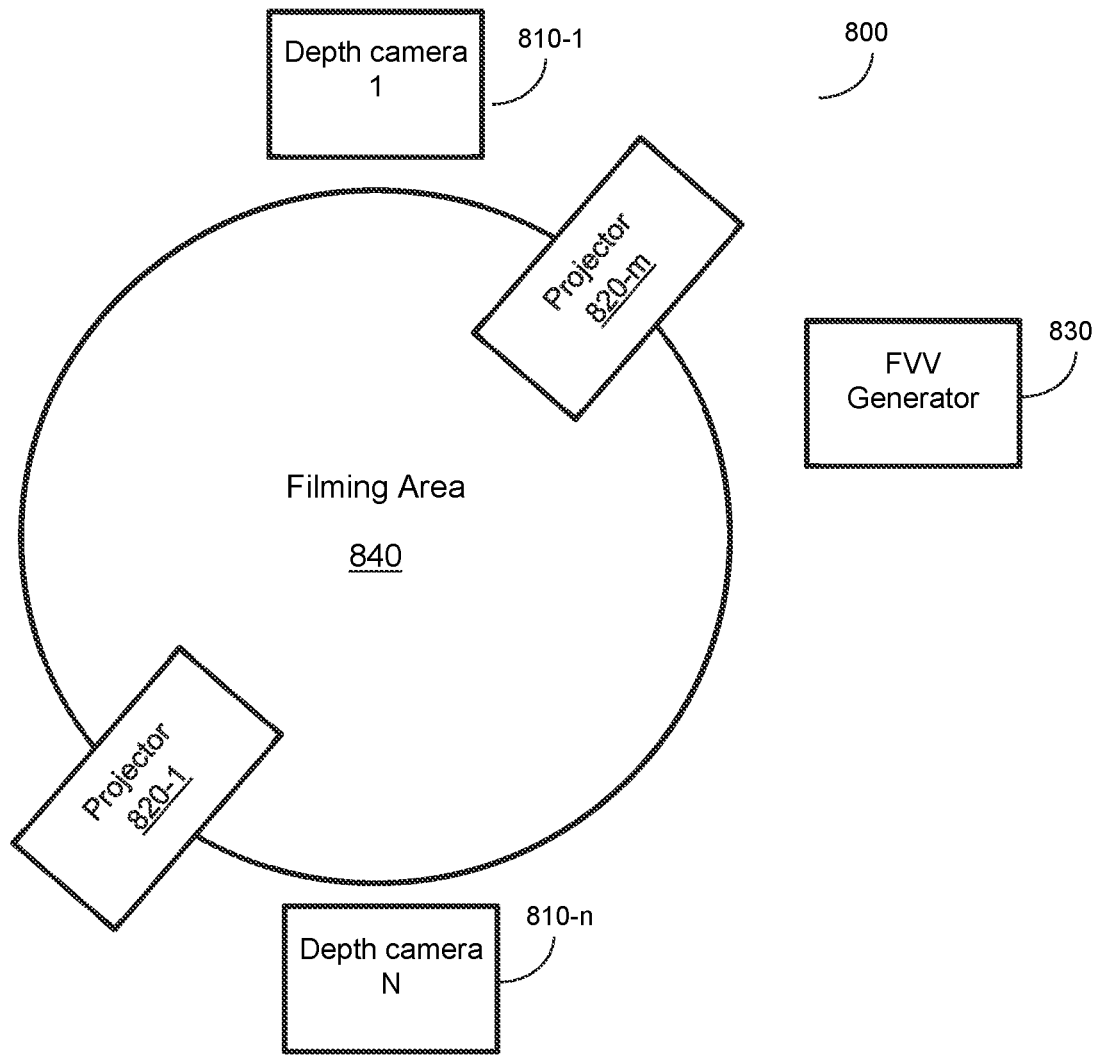
FIG. 8 is a schematic diagram illustrating example arrangements of a FVV rendering system including depth cameras, according to various disclosed embodiments.

FIG. 8 is an example schematic diagram 800 illustrating example arrangements of a FVV rendering system including depth cameras, according to various disclosed embodiments. The schematic diagram 800 illustrates depth cameras 810-1 through 810-n, where "n" is an integer greater than or equal to 2 (hereinafter referred to individually as a depth camera 810 and collectively as depth cameras 810, merely for simplicity), and projectors 820-1 and 820-m, where "m" is an integer greater than or equal to 2 (hereinafter referred to individually as a projector 820 and collectively as projectors 820, merely for simplicity), deployed to capture video based on activities occurring in a filming area 840. The images captured by the depth cameras 810 are provided to a FVV generator 830 for creation of FVVs. In an example embodiment, only one (1) depth camera can be utilized to generate the FVV. The filming area 840 may include a studio, a venue, an arena (e.g., a sport arena), and the like.

The filming area 840 may be, for example, a broadcast or Internet studio in which a program to be televised, delivered over the Internet, utilized to create a movie, or utilized for augmented reality or virtual reality applications, is recorded. Thus, the disclosed embodiments allow for FVV studio production without moving cameras, chromakeying, or both. Each of the projectors 820 is deployed in proximity to the filming area 840. The threshold distance may differ depending on, for example, the type and intensity of light emitted by the projectors 820, the configuration of the depth cameras 810, or both. The type of the depth cameras 810 being deployed are based on a maximum required range of the depth cameras 810 to the scene being filmed or recorded. Various examples are discussed below.

In the example and non-limiting arrangement, two depth cameras 810 are utilized, although one depth camera 810 or more depth cameras 810 may be utilized. In a further embodiment, three depth cameras 810 are utilized. Images captured by the depth cameras 810 are utilized to render a 3D model of the filming area and objects therein, thereby allowing for creation of FVVs from the perspective of "virtual cameras" that may be located according to, for example, a director or other user's discretion. Each virtual camera represents a perspective from in or around the filming area 840, and may be associated with a viewpoint (i.e., a location and pose) capturing activities occurring in the filming area 840. Accordingly, footage from two to sixteen depth cameras 810 may be utilized to effectively allow for an infinite number of virtual cameras.

Each depth camera 810 may include an RGB camera and a pair of black-and-white (B/W) cameras. In an embodiment, one or more projectors 820 are deployed separately from the depth cameras 810.

Each projector 820 is utilized for producing local features with respect to the area of interest to facilitate the spatial correlation operation performed for the calculation of point clouds. That is, local features may be known patterns projected onto the surface of objects in the filming area. To this end, each projector 820 is configured to project invisible light on objects in the filming area. In an example embodiment, the light source of a projector 820 may be, but is not limited to, a laser (with an eye-safety mechanism or operating at an eye-safe distance), a light-emitting diode (LED), or a standard projector lamp. The projected light is reflected off of the objects and captured by the B/W cameras included in the depth cameras 810, thereby allowing for determination of point clouds thereon.

In some arrangements, the type, number, or both, of the projectors 820 and, consequently, the filters used with the B/W cameras of the depth cameras 810, may depend on the filming location, In some implementations, each of the projectors 820 may include an eye safe laser or LED source. In an embodiment, a laser emitting radiation in the 1.5-2 micron spectral band is used. Such a laser is safe to the human eye and, thus, a much higher radiation intensity may be used to project the pattern without causing harm to humans in the studio. As such, the distance of the projector 820 and the depth cameras 810 from the studio can be increased. In such an implementation, the depth cameras 810 include a pair of cameras (instead of the B/W cameras) sensitive to such spectral bands, for example, InGaAs cameras with lenses adapted to this wavelength. Further, in some implementations, auto-tuning using other depth cameras 810 may be utilized to reduce the size of the field of view needed to be captured by each depth camera 810.

In some other implementations, each projector 820 utilizes an extended source of radiation. Use of an extended source in the visible or near infrared spectrum increases the minimum permissible energy on a human eye positioned at a distance from the projector 820. Thus, such a projector 820 extends the eye safe distance and allows for increasing the source intensity, and thus increasing the range of the depth cameras 810, i.e., a greater distance between each depth camera 810 and a far end of the studio without an unsuitable drop in quality. As an example, such a distance may be up to 20 meters. In one example, the extended source is an array of LEDs in an extended source configuration.

In yet another implementation of the disclosed embodiments, a Region of Interest (ROI) tracking module (ROI tracker) is further located in proximity (e.g., within a threshold distance) to the filming area 840. In this implementation, each depth camera 810 includes a LIDAR scanner. The ROI tracker is configured to dynamically track instantaneous ROIs in a filming area of the filming area 840.

It should be noted that the example implementation shown in FIG. 8 is non-limiting, and that other numbers of depth cameras 810, projectors 820, ROI trackers, or a combination thereof, may be equally utilized consistent with the disclosed embodiments. Further, the FVV generator 830 may be remotely located and may communicate with the depth cameras 810 over a network such as, but not limited to, a WAN, the Internet, and the like. In yet another embodiment, the processing as performed by the FVV generator 830 may be distributed among any or all of the various depth cameras 810.

Figure 9:
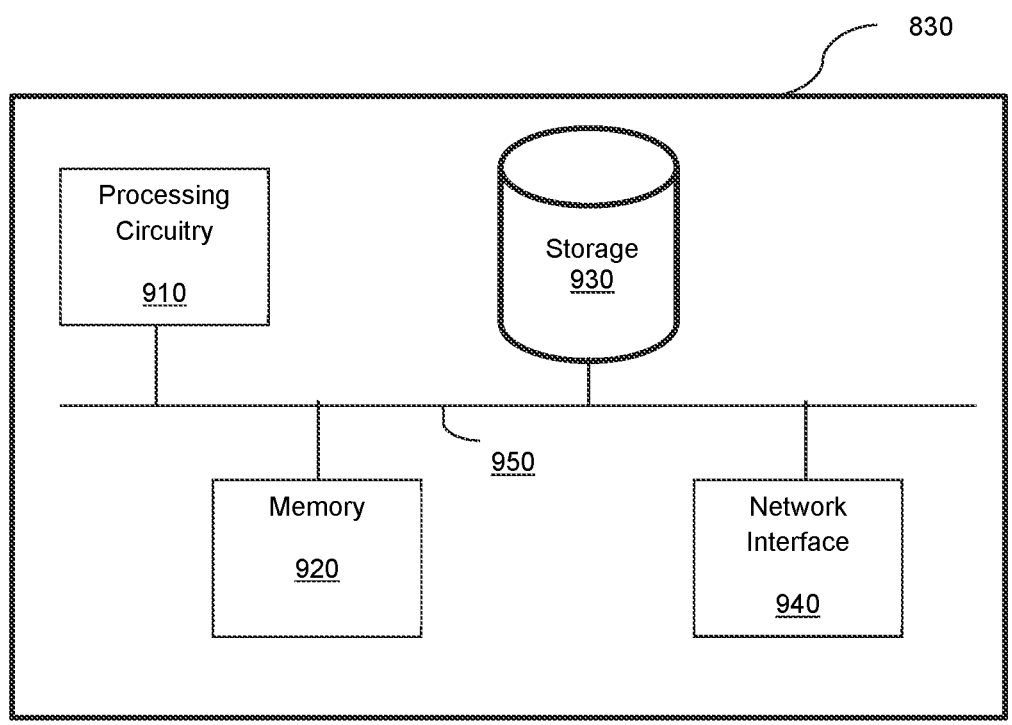
FIG. 9 is a schematic diagram of the FVV generator, according to an embodiment.

FIG. 9 is an example schematic diagram of the FVV generator 830 according to an embodiment. The FVV generator 830 includes a processing circuitry 910 coupled to a memory 920, a storage 930, and a network interface 940. In another embodiment, the components of the FVV generator 830 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 920 may be volatile (e.g., RAM, etc.), non-volatile (e.g., ROM, flash memory, etc.), or a combination thereof. In one configuration, computer readable instructions to implement one or more embodiments disclosed herein may be stored in the storage 930.

In another embodiment, the memory 920 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, configure the processing circuitry 910 to perform the various processes described herein.

The storage 930 may be magnetic storage, optical storage, and the like, and may be realized, for example, as flash memory or other memory technology, CD-ROM, Digital Versatile Disks (DVDs), or any other medium which can be used to store the desired information.

The network interface 940 allows the FVV generator 830 to communicate with the depth cameras 810, one or more user devices, one or more servers hosting recorded FVV content, or a combination thereof, for purposes such as receiving inputs from depth cameras, sending FVV renders for display, and the like.

It should be understood that the embodiments described herein are not limited to the specific architecture illustrated in FIG. 9, and other architectures may be equally used without departing from the scope of the disclosed embodiments. The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a three-dimensional (3D) representation of an object using semantic data, comprising:
receiving input data generated in response to captured video in a filming area;
assigning a label to at least one region of the input data based on an analysis thereof;
setting at least one parameter for each respective one of the at least one region of the input data based on its label; and
generating the 3D representation based on the at least one parameter and semantic data associated with the input data.

2. The method of claim 1, wherein the assigning of a label to that at least one region of the input data further comprises:
using at least one of: a deep learning method and a blendshape process.

3. The method of claim 1, wherein the at least one parameter is a mesh parameter, and wherein the mesh parameter includes a mesh density of a generated mesh.

4. The method of claim 3, further comprising:
generating a mesh with a higher mesh density for at least one of the at least one region when the at least one of the at least one region is labeled as a face, the mesh density being higher relative to mesh density for at least one of the at least one region that is not labeled as a face.

5. The method of claim 1, further comprising meshing the labeled input data, wherein the meshing further comprises:
selecting a respective mesh process for each of the at least one region based on their respective labels; and
creating a unified mesh by unifying the meshes created for each of the at least one region.

6. The method of claim 5, wherein at least one of the at least one region is assigned a label of at least one of eyes or ears.

7. The method of claim 1, further comprising:
generating a mesh of at least one of the at least one region by applying a human blendshape fitting method to generate a mesh.

8. The method of claim 1, further comprising:
determining if a region of the at least one region in the input data is labeled as a rigid body part based on semantic data; and
tracking each region of the at least one region determined to be a rigid body part.

9. The method of claim 8, wherein the tracking further comprises:
tracking at least one of movement, deformation, or other changes in the rigid body part across a time sequence.

10. The method of claim 1, further comprising:
determining if a region of the at least one region in the labeled input data is labeled as a non-rigid body part based on semantic data; and
tracking each region of the at least one region determined to be a non-rigid body part.

11. The method of claim 10, further comprising:
determining at least one property of each non-rigid body part; and
basing mesh creation of the at least one determined property, whereby mesh creation is improved.

12. The method of claim 1, further comprising:
   determining a set of compression parameters based at least an importance of each one of the at least one region; and
   applying a compression process to a mesh generated for each one of the at least one region based on the set of the determined compression parameters.

13. A non-transitory computer readable medium having stored thereon instructions for causing a processing circuitry to execute the method of claim 1.

14. A system for receiving an input data generated in response to captured video in a filming area, comprising:
   a processing circuitry; and
   a memory, the memory containing instructions that, when executed by the processing circuitry, configure the system to:
   receive input data generated in response to captured video in a filming area;
   assign a label to at least one region of the input data based on an analysis thereof;
   set at least one parameter for each respective one of the at least one region of the input data based on its label; and; and
   generate the 3D representation based on the at least one parameter and semantic data associated with the input data.

15. The system of claim 14, wherein, as to the assigning of a label to that at least one region of the input data, the system is further configured to:
   label at least a portion of the input data using at least one of: a deep learning method and a blendshape process.

16. The system of claim 14, wherein the at least one parameter is a mesh parameter, and wherein the mesh parameter includes a mesh density of a generated mesh.

17. The system of claim 16, wherein the system is further configured to:
   generate a mesh with a higher mesh density for at least one of the at least one region when the at least one of the at least one region is labeled as a face, the mesh density being higher relative to mesh density for at least one of the at least one region that is not labeled as a face.

18. The system of claim 14, wherein the system is further configured to mesh the labeled input data by:
   selecting a respective mesh process for each of the at least one region based on their respective labels; and
   creating a unified mesh by unifying the meshes created for each of the at least one region.

19. The system of claim 18, wherein at least one of the at least one region is labeled as a label of at least one of eyes or ears.

20. The system of claim 14, wherein the system is further configured to:
   generate a mesh of at least one of the at least one region by applying a human blendshape fitting method to generate a mesh.

21. The system of claim 14, wherein the system is further configured to:
   determine if a region of the at least one region in the input data is labeled as a rigid body part based on semantic data; and
   track each region of the at least one region determined to be a rigid body part.

22. The system of claim 21, wherein the system is further configured to:
   track at least one of movement, deformation, or other changes in the rigid body part across a time sequence.

23. The system of claim 14, wherein the system is further configured to:
   determine if a region of the at least one region in the labeled input data is labeled as a non-rigid body part based on semantic data; and
   each region of the at least one region determined to be a non-rigid body part.

24. The system of claim 23, wherein the system is further configured to:
   determine at least one property of each non-rigid body part; and
   base mesh creation of the at least one determined property, whereby mesh creation is improved.

25. The system of claim 14, wherein the system is further configured to:
   determine a set of compression parameters based at least an importance of each one of the at least one region; and
   apply a compression process to a mesh generated for each one of the at least one region based on the set of the determined compression parameters.

* * * * *